United States Patent [19]

VanBrederode et al.

[11] 3,886,227

[45] May 27, 1975

[54] GRAFTED POLYOLEFINS AS MODIFYING AGENTS FOR UNGRATED POLYOLEFINS

[75] Inventors: Robert A. VanBrederode; Robert A. Steinkamp, both of Baytown, Tex.

[73] Assignee: Exxon Research and Engineering Company, Linden, N.J.

[22] Filed: Dec. 4, 1972

[21] Appl. No.: 311,582

Related U.S. Application Data

[63] Continuation-in-part of Ser. No. 240,468, April 3, 1972, abandoned.

[52] U.S. Cl.......... 260/836; 260/42.18; 260/876 R; 260/897 B; 260/DIG. 35
[51] Int. Cl. .............................................. C08f 29/12
[58] Field of Search ............. 260/876 R, 897 B, 836

[56] References Cited
UNITED STATES PATENTS 2,838,437  6/1958  Busse et al.......................... 154/139
3,207,739  9/1965  Wales ................................. 260/93.7
3,483,276  12/1969  Mahlman ............................ 260/897

*Primary Examiner*—Murray Tillman
*Assistant Examiner*—C. J. Seccuro
*Attorney, Agent, or Firm*—David A. Roth

[57] ABSTRACT

Polymers, particularly polyolefins, which have been modified by being graft polymerized with from about 0.1 to 15 weight percent of a mono- or polycarboxylic unsaturated carboxylic acid monomer or derivative thereof, impart outstanding benefits to the characteristics of unmodified polyolefins when added thereto in concentrations of about 0.1 to 15 weight percent. Acrylic acid and glycidyl acrylate grafts are particularly outstanding for these purposes. And the unmodified polyolefins can be filled or unfilled grades.

3 Claims, 3 Drawing Figures

3,886,227

No. 3,886,227

GRAFTED POLYOLEFINS AS MODIFYING AGENTS FOR UNGRATED POLYOLEFINS

RELATED APPLICATIONS

This is a continuation-in-part of Ser. No. 240,468, filed Apr. 3, 1972, now abandoned.

BACKGROUND OF THE INVENTION

Stereo-regular crystalline polyolefins made from Ziegler-type catalysts, i.e., transition metal catalysts, particularly polypropylene which is substantially isotactic have enjoyed phenominal growth. They are used to produce an enormous variety of shaped articles varying from fibers to toys.

A. Nucleated Grades

Crystalline polymers in their usual form, from the reactor, have many outstandingly good properties and some undesirable ones. For example, the outstanding desirable properties of crystalline polypropylene are high tensile strength and substantial hardness. A disadvantage of the highly crystalline polypropylene is a lack of transparency or clarity, which shows up as opacity or translucency in fairly thick articles and as haze in thin films.

Highly crystalline polypropylene has another congenital disadvantage, which is its relatively low impact resistance particularly at low temperatures.

It is known within the art that the problems with opacity and haze can be alleviated to a large extent with the addition of certain materials to the polymer which are termed nucleating agents. These apparently modify the crystallization process, particularly in altering the size of the spherulites formed upon crystallization.

It would also be desirable to decrease the crystallization times and decrease warpage. And some nucleating agents will do this to some extent. Most nucleating agents tend to increase mold shrinkage, which in most instances is not preferred.

Generally speaking, the materials known to the art for nucleation purposes are either very small, finely divided solid inorganic materials, such as silica, or they are organic fatty carboxylic or polycarboxylic acids and derivatives thereof. All of these are relatively difficult to mix into the base polypropylene. Relevant prior art patents include U.S. Pat. Nos. 2,991,264; 3,517,086; and 3,207,735-739.

B. Filled Molding Grades

A wide variety of materials are used in polyolefins as fillers and as reinforcements. These typically include such inorganics as glass fibers, asbestos, talc, and the like. See pp. 330–368 of the 1970–71 *Modern Plastics Encyclopedia* which is hereby incorporated by reference in its entirety for a comprehensive disclosure of such materials.

In contrast to nucleated grades in which clarity is often a requirement, this property is not required for filled molding grades. Nevertheless, the latter grades do require to a far greater degree than other grades, one or more of the following properties: good impact resistance, high tensiles, good secant flexural modulus, and good heat deflection.

C. Impact Grades

These can be filled or not as the situation demands. Usually they will have copolymer and/or elastomeric components and therefore clarity is not a requirement. One or more of the other properties discussed above are often required.

Glass fibers are shown with grafted polyolefins in French Pat. No. 1,511,863; British Pat. No. 1,094,439; U.S. Pat. No. 3,579,476; and U.S. Pat. No. 3,437,550.

SUMMARY OF THE INVENTION

A modified polymer (particularly a polyolefin) having grafted carboxylic acid (or derivatives thereof) side chains theron is an additive which confers a variety of outstanding benefits when added to unmodified polymers, especially polyolefins (either filled or unfilled). The additive is surprisingly effective in relatively low concentrations for most uses, but also is preferred in relatively high concentrations for special uses.

DETAILED DESCRIPTION OF THE INVENTION WITH PREFERRED EMBODIMENTS

Figure 1:
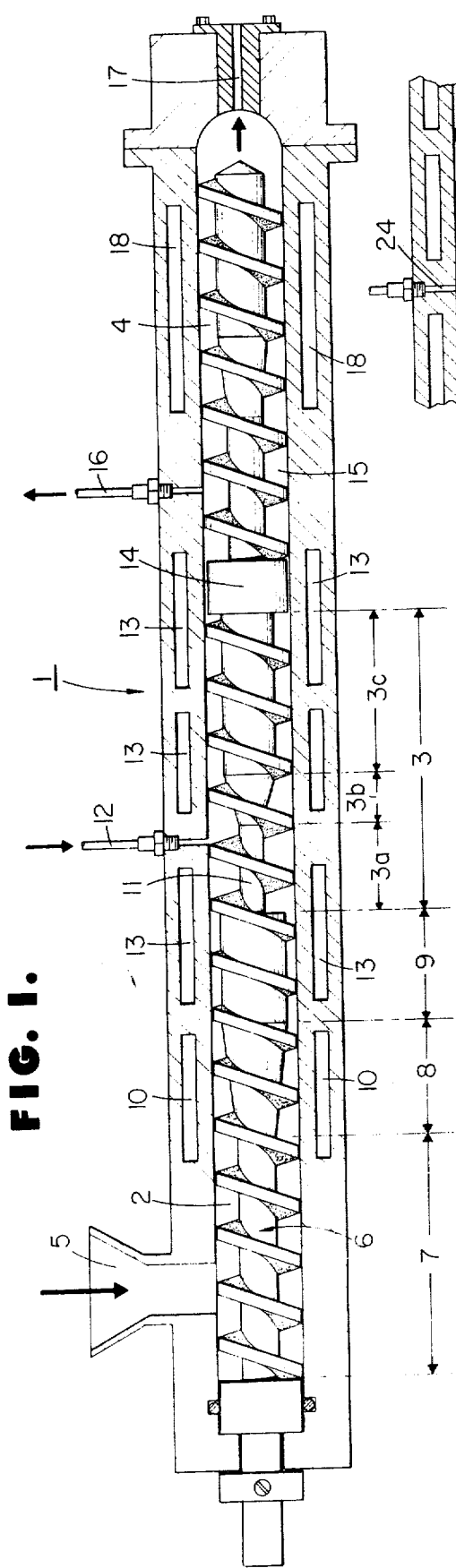
FIG. 1 is a schematic view of one preferred extruder apparatus embodiment suitable for preparing the grafted additives of the present invention wherein an initiator and/or monomer is added to a decompression zone.

It has been discovered and forms the essence of this invention that certain acid (or derivatives thereof) grafted olefin polymers can be added to other polymers, particularly crystallizable olefin polymers, in relatively small proportions to produce novel compositions of matter. These novel compositions exhibit outstanding properties as impact, filled and nucleated grades.

Thus, such grafted polymers not only can perform as nucleating agents but as all-purpose modifying agents, i.e., modifying additives for all molding grades, especially impact and filled grades. The resulting polymer compositions containing such agents require substantially shorter time periods to achieve maximum crystallization rates under isothermal conditions. They crystallize at higher temperatures when cooled from the melt and they produce smaller spherulites than comparable non-nucleated polypropylene polymers.

Other physical properties of crystallizable olefin polymers (filled or non filled) which are improved with this type of agent are the impact properties, secant flexural modulus (ASTM D790) and tensile strength (ASTM D638). And for non-filled and non-impact grades, the transparency of the polymer is considerably increased.

Moreover, the polymer compositions of the invention resulting from the combination of small quantities of the modifying agents described herein plus unmodified polymer show substantially less warpage from molding than do polymers not containing the agents of the invention. They require less molding time. Furthermore, they tend to shrink more in the mold and therefore, under some conditions, tend to possess better release properties.

One of the most important properties a filled polymer should possess is that of resisting deformation or flow under elevated temperatures at some load. A standard method of assessing a given polymer's characteristic in this regard is referred to as the heat-distortion point or more commonly "heat deflection temperature" (HDT).

The test is fully described in ASTM D648-56 and briefly described measures the temperature at which a standard test bar deflects 0.010 inches under a stated load of either 66 or 264 psi.

Crystallizable polyolefins, particularly reinforced and filled crystalline polypropylene compounds to be used in environments where high temperatures are a problem, desirably will have relatively high HDT's. Examples of such demanding applications are under hoods of automobiles, in washing machines, dryers.

It is known that the use of fillers (talc) and reinforcements such as glass fibers will raise the HDT of thermoplastics. It has been found and forms a feature of this invention that small quantities of the modifying agents in polypropylene compositions raise the heat deflection temperature of both filled and unfilled grades.

But more significantly, it has been found and forms an important feature of this invention that fibrous glass reinforced polypropylenes which contain small amounts of modifying agents exhibit heat deflection temperatures far higher than the additive effects of either alone and thus exhibits a pronounced synergistic phenomena.

The modifying agents of this invention offer several additional important advantages. One of the most significant of these lies in the area of mixing. For instance, it is very difficult to mix finely divided materials such as silica or organic acids which the art has taught act as nucleating agents with the relatively high molecular weight polymers that are to be nucleated. It is desirable (and it has been accomplished by the technique of the present invention) that the modifying agents be essentially similar in physical properties to the materials to be molded and therefore can be blended in just as any other compatible polymer with the material to be molded.

Furthermore, a class of nucleating agents of the art, which are primarily based on organic acids, normally are also difficult to handle and they present problems in the mold. Thus, these materials are very often slightly volatile to extremely volatile. Under the high temperatures encountered in molds they tend to plateout on the molds and cause deposits and other undesirable contamination in very expensive molds. In extremely sharp contrast, the agents of the present invention do not suffer from any of these disadvantages.

Sodium benzoate which has been used commercially as a nucleating agent must be introduced as very fine particles to be effective. That necessitates expensive size reduction steps.

The additives of the present invention are also highly advantageous in that relatively small quantities can be used and therefore the material imparts a considerable economic benefit to the total blend.

It has been further noted that the spherulite dimensions in the crystallized articles produced from the compositions of the invention are substantially smaller than they would have been in an article produced in an identical manner from the same polymer without using a modifying agent.

It is also noted that the transparency of films or even thicker shaped articles produced from nucleated compositions prepared according to this invention are substantially improved as compared to articles that have not been nucleated.

Another advantage of the invention is that in general better mixing or homogenization of the polymer melt blend with the modifying agent is obtained. Thus, the modifying agent of the invention disperses more easily and more uniformly than conventional additives, especially as compared to conventional nucleating agents.

Another advantage for the invention is that the novel composition mixtures according to the invention solidify at an appreciably higher temperature than those of identical polymers not containing the modifying agent, hence processing can be carried out in a considerably shorter period of time, i.e., decreased cycle time, thus gaining much better utility on expensive capital investment processing equipment. Thus, reduced cycle time and warpage benefits are achieved from the nucleating effect of the modifying additives, even when clarity is not a desired characteristic.

As indicated above, one of the mechanical disadvantages of crystalline polyolefins such as polypropylene in addition to the transparency problem is the lack of impact strength, particularly at the low temperatures. Manufacturers have adjusted to this deficiency with many techniques, probably the best known is the use of flexibleizing polymers such as rubbery substances to be incorporated in the crystalline polymer.

These rubbery substances include polyisobutylene, polybutadiene, polyethylene-propylene elastomers and the like. Furthermore, the elastomeric components and plastic components making a binary mixture can be also modified with various polyethylenes and ethylene copolymers which are flexible and interact with the other two polymers in an unknown manner to produce ternary mixtures of good impact strength.

Although special emphasis is placed on crystallizable polyolefins, e.g., $C_2$ to $C_8$ $\alpha$-olefin polymers such as polypropylene, polyethylene, etc., many other crystallizable thermoplastics can benefit from the technique of the invention, either when blended with crystallizable polyolefins, such as polypropylene, or when used entirely separately. These include nylon (polyamides) polyesters, polyacetals, polycarbonates, and the like.

It is a feature of the present invention that the modifying agents are equally effective and to some extent even more effective at nucleation with binary and ternary impact mixtures of crystalline polyolefins, particularly those which are predominantly polypropylene.*

*Ethylene-propylene reactor copolymers are also benefitted by the addition of the modifying agents of the invention.

Moreover, for most uses the agent need only be added in very low quantities. Furthermore, some improvement in transparency of even binary or ternary blends can be obtained with the use of the agent of the invention but more important improvements are noted in other properties. One of the advantages of the invention as alluded to above is that mixing can be accomplished directly in the extruder avoiding the intensive mixing, e.g., hot rolls and Banburry mixer kneading which would be necessary with conventional nucleating agents of the art such as sodium benzoate.

Photomicrographs taken of modified compositions of the invention containing fibrous glass fillers indicate the degree of adhesion to the glass is far greater than with no grafted component present. Apparently, the grafted component, i.e., acrylic acid, or glycidyl acrylate interacts in some manner with the reinforcing material.

It also is to be noted that although the emphasis thus far has been on using relatively small quantities of modifying agent, and that is considered the primary novel feature of the invention, for maximum improvement of certain physical properties (such as heat deflection) considerably higher quantities of the modifying agent should be used. Such quantities are in the order of more than 15 up to about 60, preferably 20 to 50, and most preferably 30 to 50 weight percent.

Other properties of the polypropylene composition that improve with relatively large quantities of modifying agent are the tensile strengths and the Izod impact strengths. These are often glass-reinforced compositions and are used in applications such as dishwasher agitators, gears, under the hood where very rugged conditions prevail. Although, except for Gardner Impact properties, the other properties of such compositions (with relatively large amounts of modifying agent) do not deteriorate, no improvement is noted in nucleation once the level of relatively small quantities of modifying agent is exceeded. And usually, there is no economic advantage for using excess modifying agents, i.e., more than 60 weight percent, except when the special properties described herein are desired.

For the purposes of this invention, the term "modifying agent" is defined as the particular grafted polymeric additive described in detail herein. It excludes additives which are conventionally incorporated in polymers.

From time to time other special situations will arise where greater than normal quantities of the modifying additive will be required, such as when certain pigments are used. Some pigments tend to interact with the acid constituent of the modifying agent and neutralize its effect. Therefore, in those instances greater quantities of modifying agent must be used to overcome this adverse effect. But it is to be noted as an important observation that glycidyl acrylate graft modifying agents do not suffer from pigment deactivation.

Another aspect of the present invention resides in the aspect of the MFR of the base polymer as opposed to the MFR of the grafted polymer modifying agent. One of the facets of the invention is that when both MFR's are relatively high, compositions result with better properties. Therefore, it is preferred that both MFR's be relatively high, i.e., 3 to 500, preferably 5 to 200 and most preferably 5 to 100.

It is not necessary that the modifying agent be incorporated into a relatively high MFR base polymer, but in some instances it is preferred since superior results occur.

There is another special inventive feature of the invention which must be noted. That is preformed metallic salts of the acid (preferably acrylic) grafts are also very effective as nucleating agents. These can not only be used as nucleating agents but also can be used for the other end-use applications, for which the modifying agents of the invention have been described as being especially useful. Particularly preferred preformed salts are formed from the alkali metals, especially sodium and aluminum.

The term "preformed salts" is used to distinguish the salts which result from in situ reactions with functional groups of the graft with residual salts or ash in either the grafted polymer or the improved polymer.

The amount of grafted material or component or monomer which can be conveniently introduced or grafted into a base polymer, which latter is to be used for a modifying agent, usually ranges from 1 to 20 weight percent, depending on the grafting system used. In extruder grafting, the grafting reaction takes place in a very, very short period of time and in a relatively limited space while the polymer is passing through the extruder. Therefore, generally it is convenient to graft only about 1 to 10 weight percent of graft polymer to the backbone polymer without generating excessive amounts of homopolymer, e.g., homocarboxylic acid or acid derivative polymers. Quantities of from 1 to 40 weight percent of homopolymer from the grafting monomer can be tolerated without any noticeable adverse effects. However, quantities of homopolymer above that limit are not preferred.

But, for the purposes of this invention, the additive graft polymer, i.e., modifying agent, will generally contain from about 0.1 to 15, preferably 2 to 8 and most preferably 4 to 10 weight percent of grafted component.

This graft polymer modifying agent when used as a nucleating agent and for other than very high tensiles and high Izod impacts will generally be used in amounts of from 0.1 to 15, preferably 0.5 to less than 5, especially preferably 0.5 to 3 and most preferably 0.5 to 2 weight percent blended with other polymers based on a total weight percent of the resulting polymer blend.

Thus, the amount of grafted component in the resulting blend will be very small. This is illustrated as follows:

| Wt. % of Grafted Component in Grafted Polymer | Wt. % of Grafted Polymer in Final Blend | Wt. % of Grafted Component in Final Blend |
| --- | --- | --- |
| 0.1 to 15 | 0.1 to 15 | .0001 to 2.25 |
| 2 to 8 | 0.5 to 3 | .01 to 0.24 |
| 4 to 10 | 0.5 to 2 | 0.06 to 1 is a preferred range |

One can easily calculate suitable amounts of modifying agents to be used based on the above considerations.

Graft polymers which will operate suitably in the compositions of the invention as modifying agents, such as nucleating agents, and processes for making them are described in the art. See, for instance, U.S. Pat. Nos. 3,177,269; 3,177,270; 3,270,090; British Pat. No. 1,217,231; British Pat. No. 679,562, and the like. But, the most preferred ones are prepared by a process to be described as follows The preferred monomers which are grafted to a backbone polymer to form the modifying agents of the invention are $C_3$ to $C_{10}$, preferably $C_3$ to $C_6$, unsaturated mono- and polycarboxylic-containing unsaturated acids with preferably at least one olefinic unsaturation, anhydrides, salts, esters, ethers, amides, nitriles, thio, glycidyl, cyano, hydroxy, glycol, and other substituted derivatives thereof.

Examples of such acids, anhydrides and derivatives thereof include maleic acid, fumaric acid, itaconic acid, citraconic acid, acrylic acid, glycidyl acrylate, glycidyl methacrylate, $C_1$ to $C_{20}$ alkyl cyano acrylate, hydroxy ethyl methyacrylate, acrylic polyethers, acrylic anhydride, methacrylic acid, crotonic acid, isocrotonic acid, mesaconic acid, angelic and, maleic anhydride, itaconic anhydride, citratronic anhydride, acrylonitrile, and methacrylonitrile, sodium acrylate, calcium acrylate, and magnesium acrylate.

Other monomers which can be used either by themselves or in combination with one or more of the carboxic acids or derivatives thereof include $C_8$ to $C_{50}$ vinyl monomers such as monovinyl aromatic compounds, i.e., styrene, chlorostyrenes, bromostyrenes, $\alpha$-methyl styrene and the like.

Other monomers which can be used are $C_{10}$ to $C_{50}$ vinyl esters and allyl esters, such as vinyl butyrate, vinyl laurate, vinyl acetate, vinyl stearate, vinyl adipate and the like, monomers having two or more vinyl groups, such as divinyl benzene, ethylene dimethacrylate, triallyl phosphite, diallylcyanurate and triallylcyanurate.

Nevertheless, for the most outstanding results it is preferred that the graft copolymer meets some highly specific criteria. Primary is the concept that the graft copolymer not only contain grafted active functionality but that the backbone polymer itself be reduced at least somewhat and even considerably in molecular weight so that it is more compatible with other components of the total composition (fillers for instance) and also exerts a much more powerful synergistic influence on the overall composition.

Furthermore, $C_3$ to $C_{10}$ monocarboxylic acid (and their derivatives) grafted polymers are most effective.

CHARACTERISTICS OF THE PREFERRED MODIFYING AGENT

The preferred graft polymer to be used in the novel compositions of the invention can be characterized in several respects. These are:

1. A melt index of MFR of from 1 to 1,000 preferably 10 to 250, most preferably 10 to 100 and most preferably at least 25%, better 50%, and best 200% higher than the MFR or melt index of a starting polymer having a MI or MFR of from no flow to 50 as measured under conditions of A.S.T.M. Test No. D-1238-65T.
2. A graft comonomer content of from 0.1 to 15, preferably 2 to 8 and most preferably 4 to 10, based on the total weight of the graft copolymer.
3. A die swell at least 0.05 and preferably 0.10 of a unit less than that of the base polymer.

In an especially preferred embodiment, the present invention utilizes a grafted polymer of a $C_2$ to $C_8$ $\alpha$-olefin or its copolymers with acrylic acid (or derivatives thereof), which graft has been prepared by a special process. The polymers of $C_2$ to $C_8$ $\alpha$-olefins are commonly referred to as polyolefins and for the purpose of this invention are to include copolymers of the $C_2$ to $C_8$ $\alpha$-olefins with each other and with other monomers as well as the homopolymers.

Polymers containing diolefins such as butadiene and isoprene are also suitable. The polyolefins are produced utilizing in most instances a transition metal (Ziegler) catalyst, but can also be Phillips catalysts and high pressure technology. The processes for making the $C_2$ to $C_8$ polyolefins are well known and form no part of the present invention.

Examples of suitable polyolefins, both plastic and elastomeric, include low or high density polyethylene, polypropylene, polybutene-1, poly-3-methylbutene-1, poly-4-methylpentene-1, copolymers of monoolefins with other olefins (mono- or diolefins) or vinyl monomers such as ethylene-propylene copolymer or with one or more additional monomers, i.e., EPDM, ethylene/butylene copolymer, ethylene/vinyl acetate copolymer, ethylene/ethyl acrylate copolymer, propylene/4-methylpentene-1 copolymer and the like. The term "copolymer" includes two or more monomer constituents and substituted derivatives thereof.

The preferred polyolefins employed as base polymers to prepare the modifying agents contain propylene and/or ethylene, i.e., polypropylene and polyethylene. The starting polymer used as a base material in the present invention will preferably have a melt index (MI) of 1 to 40, preferably 5 to 40, and most preferably 15 to 40, or melt flow rate (MFR) between about 0.1 to 50 and preferably 0.1 to 5.0, most preferably 0.5 to 2.

In the preparation of normally solid polymers of 1-olefins, certain rheological properties are frequently utilized for control purposes. One of these rheological properties more usually employed is melt index or melt flow rate which characterizes the processability of the polymers and is also an approximate indication of polymer molecular weight.

The melt index of polyethylene is measured normally according to the A.S.T.M. Test D-1238-65T. In this test the rate of extrusion in grams per 10 minutes (through an orifice 0.0825 inch in diameter and 0.315 inch in length) is determined for the polymer at 190° C. under the weight of a piston having a diameter of 0.373 inch and weighing in combination with its plunger 2,160 grams. The melt flow rate (MFR) of polypropylene is determined by the same procedure except at a temperature of 230° C. according to A.S.T.M. D-1238-65T.

The apparatus utilized for determining melt index is defined in A.S.T.M. manual as a "dead-weight piston plastometer."

Generally speaking, polypropylene from a reactor will have MFR below 1, while polyethylenes from a reactor can have a MI of about 0.5 to 30.

The preferred monomers to be grafted to the $C_2$ to $C_8$ polyolefin and other polymers to prepare the modifying agents of the present invention are maleic anhydride, acrylic acid, methacrylic acid, glycidyl acrylate, hydroxy $C_2$ to $C_{20}$ alkyl methacrylates and their derivatives. Others that can be used are described elsewhere herein. However, other monomers may be added in admixture with these such as maleic anhydride (MA), styrene, acid esters, salts and the like to form graft copolymers. MA and styrene and MA and acrylic acid are preferred over MA alone when polymer grafts of MA are desired.

The grafting reaction is initiated by a free-radical initiator which is preferably an organic peroxygen compound. Especially preferred peroxides are t-butyl perbenzoate, dicumyl peroxide, 2,5-dimethyl-2,5-di-tert-butylperoxy-3-hexyne (Luperson 130), $\alpha,\alpha'$-bis(tert-butylperoxy)diisopropyl benzene (VulCup R), or any free radical initiator having a 10-hour half-life temperature over 80° C. or mixtures thereof. Generally, the higher the decomposition temperature of the peroxygen compound, the better. See pp 66-67 of *Modern Plastics*, November 1971, which is incorporated hereby by reference, for a more complete list of such compounds.

A particularly preferred polymer made by a process described and claimed in a co-pending commonly assigned application involves grafting the polyolefin during the course of an extruder reaction. That process is generally described as follows:

AN ILLUSTRATIVE EMBODIMENT OF A PREFERRED PROCESS FOR PREPARING THE MODIFYING AGENTS OF THE INVENTION

Referring to FIG. 1, an extruder 1, having a feed zone 2, a reaction zone or chamber 3, and a final metering zone 4 is utilized to carry out a preferred embodiment of the grafting process of the present invention.

In effect, polypropylene of a predominantly isotactic crystalline nature is introduced into a hopper 5 in the feed zone 2 of the extruder 1. The extruder screw 6 in feed zone 2 can be of various conventional designs such as a feed portion 7, a transition portion 8 and a first stage metering portion 9.

In feed zone 2, the polypropylene is heated by heaters 10 to a barrel temperature in the range of 400° to 650° F., preferably 400° to 550° F. It is one of the advantages of this invention that fairly low temperatures can be used to accomplish outstanding modification.

Extruder screw 6 has a root (sometimes called core) starting at the initial boundary of reaction zone 3 with a reduced cross-sectionaal area 11. This provides additional volume for reaction zone 3. When polymer under pressure reaches zone 3, the increased available volume results in a pressure drop, i.e., decompression, so that particular mass of polymer is not subjected to the ordinarily high pressures in the extruder.

An injection line 12 connects reaction zone 3 to a source of initiator, preferably a peroxide. In some instances the peroxide will be combined with an active monomer. For the purposes of this specific embodiment, the monomer is acrylic acid and the initiator is VulCup R.

Injection of initiator or initiator and monomer at this point, where low pressures in zone 3 prevail, provides thorough dispersion of the initiator in polypropylene over an extremely short period of time and appreciable scission or degradation of the polypropylene result. Appropriate controls of the polypropylene feed rate and screw speeds are maintained.

The process of the invention can be conveniently operated to give high throughputs with good quality. In this particularly preferred embodiment, the initiator and acrylic acid are added as a liquid blend to zone 3. When only degradation is desired, initiator alone or initiator dissolved in a solvent is introduced into zone 3.

It has been found that appreciable degradation of the polypropylene occurs when the back pressure against the liquid mixture of initiator and acrylic acid in injection line 12 is less than about 100 psig, preferably about 0 psig.

The pressure in injection line 12, therefore, provides one indicia that the polypropylene feed rate and screw speed are being approximately controlled for the particular products desired.

The resulting graft copolymers of the present invention have been appreciably degraded and changed in molecular weight distribution as compared to the base polymer. This is demonstrated by the fact that the graft copolymers of the invention have a lower die swell than the polypropylene base stock used in making the copolymer. Lower molecular weights are also indicated by changes in melt flow rates.

The portion of the extruder heated by heaters 13 will have a temperature of from about 160° to 450° F., preferably 250° to 350° F. The important thing is that the polymer be substantially in a melt phase during the reaction. The extruder screw 6 in the latter portion of reaction zone 3 can have any desired root cross-sectional area desirable to provide for pumping and ancillary mixing if desired and to allow residual reactants to complete their reaction.

It is to be noted that some homopolymerization of the acrylic acid (or any other monomer) to form polyacrylic acid also occurs. But this usually does not exceed 30% of the total acrylic polymer formed, particularly at the low monomer concentrations.

Preferably, the decompression portion 3a of the screw is immediately followed with transition zone 3b of gradually increasing screw root cross-sectional area followed by a metering zone 3c of constant cross-sectional screw root area.

Thereafter, extruder screw 6 has a melt seal (also called cap or blister) 14 which prevents the free escape of initiator and acrylic acid from reaction zone 3.

Screw 6 also has a second decompression portion 15 following blister 14.

Vent line 16 (which can be optionally provided with vacuum, if desired) is positioned above decompression portion 15 to remove gases or vapors. When operating without vent line 16, blister 14 may be omitted.

The graft copolymer and homopolymer blend is then passed through metering zone 4 where it is extruded from a die 17 at the end of extruder 1.

The extruder barrel temperature heated by heaters 18 in metering zone 4 is in the range of 350° to 550° F., preferably 350° to 450° F.

Figure 2:
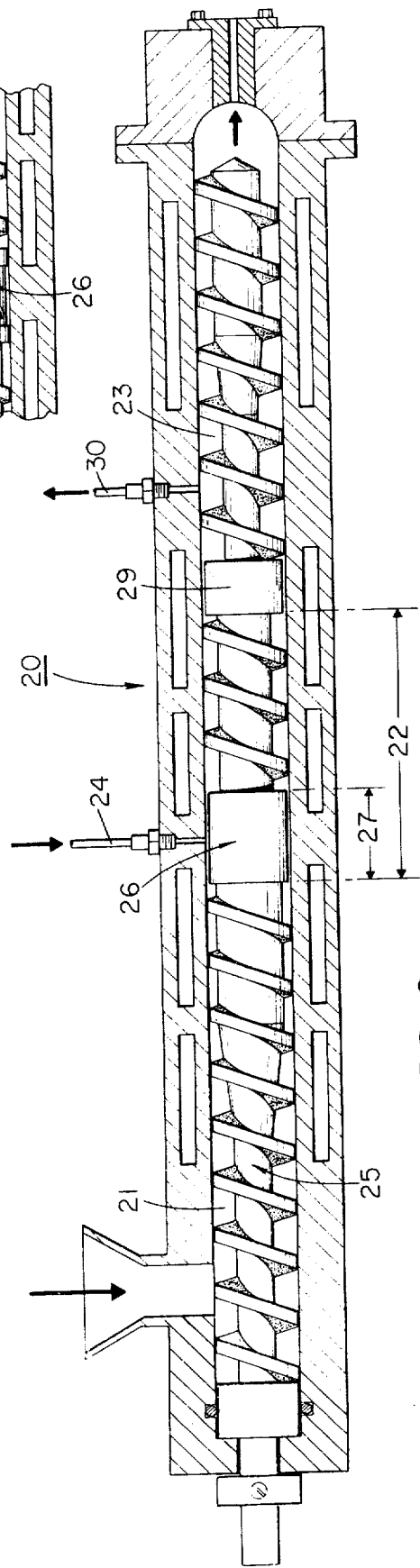
FIG. 2 is a schematic view of another preferred extruder apparatus embodiment for preparing the modifiers wherein a high shear-thin film zone under high pressure conditions is provided for appropriate polymer reactions and for exceptionally good mixing.

Referring now to FIG. 2, extruder 20, having a feed zone 21, a reaction zone 22 and a final metering zone 23, is also utilized to carry out the grafting process of the present invention. The process is generally similar to that described above for FIG. 1, except as follows. In one preferred embodiment, the initiator and acrylic acid are injected through injection port 24 at a point where the extruder screw 25 has a root 26 of very large cross-sectional diameter. The clearance between this portion of the root and the interior of extruder 20 is very small and will vary with extruder size. In the actual 2-inch extruder apparatus used, this clearance is from 5 to 50, preferably 10 to 25, and most preferably 10 to 20 mils.

Figure 3:
FIG. 3 is a schematic view of a special "Egan" mixer which can be used in the apparatus of FIG. 2.

In another preferred embodiment shown in FIG. 3, the root of increased cross section or mixing device 26 is shown with a series of channels out in the perimeter of the device. This results in a series of dead end channels. Under pressure, this forces the polymer out of the inlet channels and across the outer surface to the outlet channel. Other suitable devices could be used.

The novelty and unobviousness of the technique reside in the combination of such a mixing device with means to introduce reactants at a relatively early stage in the extrusion process.

In any event, whether the embodiments of FIG. 2 or FIG. 3 are used, the polymer forms a thin fluid film under relatively high shear as compared to the other portions of the extruder.

The initiator and/or acrylic acid are injected at pressures which range between 200 and 5,000 psi or more specifically, between 500 and 3,500 psi. At these high pressures and because only a thin film of polypropylene is present at the high shear-thin film zone 27 of reaction zone 22, intensive, instantaneous mixing followed by appreciable degradation of the polymer, e.g., polypropylene, occurs.

Extruder 20 is also provided with a blister 29 and a vent 30. As in the case of the FIG. 1 extruder, both the vent and blister may be eliminated if desired.

As illustrated by the two embodiments of FIG. 1 and FIG. 2, various extruder designs may be employed to carry out the graft copolymerization process of the present invention. However, the common characteristics of each extruder design is that thorough, instantaneous mixing of the initiator and acrylic acid with the polymer, i.e., polypropylene, occurs. The extremely high degree of mixing which characterizes the process of the present invention is evidenced by appreciable degradation of the polymer. Evidence for the appreciable degradation of the polyolefin is shown by the substantial increase in the melt flow rate or melt index of the copolymer over the base resin. Evidence for a narrowing of the molecular weight distribution is seen from the fact that the die swell of the graft copolymer is lower than the die swell of the polyolefin base stock used in making the copolymer. It is to be emphasized that a change in molecular weight distribution leads to many useful and novel properties of the resulting polymers.

DIE SWELL

Some high molecular weight polymers such as polyolefins when forced through a capillary die of a relatively short length produce an extrudate of a larger diameter than the diameter of the capillary.

This property of polymers has been characterized as die swell which is expressed numerically as the ratio of the diameter of the extrudate to the diameter of the capillary (by some the ratio to the first power and by others to the second power). The term "die swell" as used herein is defined as follows:

$$\text{die swell} = \left(\frac{D_e}{D_o}\right)^x$$

where:
$D_e$ is the extrudate diameter
$D_o$ is the capillary diameter.

The numerical value of die swell is also dependent on the geometry of the rheometer used to force the polymer through the capillary. In obtaining the numerical values set forth herein, and in the tables which follow, a rheometer having a rheometer barrel of ⅜ inch I.D. (inside diameter) was used wherein the barrel was heated to a temperature controlled to ±2° F. of the recorded temperature and the polymer was forced through a capillary having a 0.03018 inch I.D. and which was 1.006 inch long. The capillary had a 90° entry angle.

The measurements were made by forcing the polymer through the capillary by a plunger operating at a constant speed or a constant shear rate ($\gamma$) ranging from 13.5 reciprocal seconds to 338.3 reciprocal seconds ($\sec^{-1}$). The polymer was forced through the capillary into ambient air at room temperature (70° – 80° F.).

The measurement of die swell is frequently used as a gross measure of molecular weight distribution.

GENERAL REACTION CONDITIONS

The free radical initiator is used in amounts corresponding to 0.005 to 5, preferably 0.02 to 2, most preferably 0.02 to 1.0 weight percent based on polymer.

The monomer to be grafted polymerized is used in amounts of 0.01 to 100, preferably 0.05 to 50, and most preferably 0.1 to 25 weight percent of the base polymer. An especially preferred range is from 1.0 to 15. High graft conversions are obtained at these levels.

Generally, the monomer and initiator are blended together and added simultaneously, except in the situation of a polyethylene or ethylene predominant copolymer.

Therefore, in the description of the grafting process herein, from time to time certain differences in the applicable process conditions must be employed when the primary characteristics of the polymer are determined as a result of its ethylene content.

It is also to be noted that the grafting process is applicable to elastomers of all classes which are capable of being handled by an extruder. Examples include natural rubber, polyisobutylene, butyl, chlorobutyl, polybutadiene, butadiene-styrene, ethylene-propylene, ethylene-propylene diene terpolymer elastomers and mixtures thereof with each other and with thermoplastic polymers. Blends of elastomers and plastics in any portions particularly benefit from being processed by the preferred process.

Terblends of 30 to 80 weight percent polypropylene, 35 to 10 weight percent elastomer, such as EPR or EPDM and 35 to 10 weight percent of high density polyethylene filled with 5 to 85, preferably 10 to 60, and most preferably 10 to 30 weight percent of glass fibers are one of the preferred blends which benefit in several major properties from the inclusion of the modifying agents of the invention.

The invention will be further illustrated by the following examples.

EXAMPLE 1

A series of polypropylene polymer compositions were prepared from various lots of commercial, highly crystalline isotactic polypropylene compositions by adding thereto either a commercial nucleating agent, i.e., sodium benzoate or a grafted polymer modifying agent comprising acrylic acid grafted to polypropylene. The graft had a melt flow rate of about 50 and contained about 6 weight percent of grafted acrylic acid and was produced by the extruder grafting process described above.

Generally the acrylic acid grafted polymer was tested at weight percents of 1 to 10 and evaluated for nucleation effect in various ways. The results of these tests and evaluations are summarized below in Table 1.

TABLE I

EVIDENCE FOR THE NUCLEATION OF POLYPROPYLENE POLYMERS BY THE INCORPORATION OF ACRYLIC ACID GRAFTED POLYPROPYLENE (PNA)

| Base Compositions | Nucleating Agent | Time to Maximum Crystallization Rate*, Min. | Temp. of Maximum Crystallization** °C. | Spherulite Size***, μ |
|---|---|---|---|---|
| 1. Enjay E-115 | 200 ppm Sodium Benzoate | 0.85 | 120 | <2 |
| 2. Enjay CD-490 | a) None | >60 | 108 | ~40 |
|  | b) 10 Wt. % PNA | 1.35 | 123 | <2 |
|  | c) 1 Wt. % PNA | 2.2 | 120 | <2 |
| 3. Enjay CD-460 | a) None | 17 | 110 | ~10 |
|  | b) 10 Wt. % PNA | 1.15 | 124 | <2 |
|  | c) 1 Wt. % PNA | 1.6 | 122 | <2 |
| 4. Enjay CD-392 | a) None | >60 | 109 | ~10 |
|  | b) 10 Wt. % PNA | 1.35 | 122 | <2 |
|  | c) 1 Wt. % PNA | 2.1 | 119 | <2 |
| 5. Enjay E-115 | a) None | 30 | 110 | ~20 |
|  | b) 10 Wt. % PNA | 1.15 | 125 | <2 |
|  | c) 1 Wt. % PNA | 1.75 | 122 | < 2 |

*Polymer is melted at 200°C, held at this temperature for 5 minutes and quickly cooled to 130° C in a Perkin-Elmer Differential Scanning Calorimeter. The time required to achieve the maximum crystallization rate is measured from the time the sample reaches 130° C to the time where there is maximum imbalance between the DSC platens.

Comments

As can be seen from the above Table I, the nucleating agents of the invention reduce the spherulite size to that comparable to those obtained with a commercial nucleating agent. Furthermore, the temperature of maximum crystallizations of the compositions containing a nucleating agent of the invention was at least comparable to those temperatures obtained with a commercial nucleating agent and in several instances were higher, the highest temperature being about 125° C. Furthermore, it can be seen that the time to realize maximum crystallization rates decreased dramatically over that of the polymer containing no nucleating agent.

It is also to be noted that while considerable improvements over the base polymer are to be noted at the 10 weight percent usage of the grafted acrylic acid polymer, almost comparable results are obtained with only 1 weight percent of grafted polymer. That indicates one of the exemplary advantages of the invention in that very small and therefore economic quantities of the modifying, e.g., nucleating agent of the invention are required.

In a direct comparison between a sodium benzoate nucleated polypropylene and a polypropylene nucleated according to the invention, the two are comparable in spherulite size. The polypropylene nucleated according to the invention is marginally superior in temperature of crystallization properties and sodium benzoate is marginally superior in maximum crystallization times. All percentages used herein are weight percents unless otherwise indicated.

Some of the polymers modified as indicated above were further evaluated in flexural modulus and tensile strength and Izod Impact Energy tests, the results are shown below in Table II.

As can be seen in Table II, which follows, the use of the modifying agents produces compositions of the invention with improved secant flexural modulus and the tensile strengths. As to Izod Impact strengths, they remain essentially the same at very low temperatures which is the important area for evaluating impact strengths.

TABLE II

PHYSICAL PROPERTIES OF ACRYLIC ACID MODIFIED POLYPROPYLENE (PNA) NUCLEATED POLYPROPYLENE POLYMERS

| Sample | Nucleating Agent | Secant Flexural Modulus, psi | Tensile Strength at Yield, psi | Izod Impact Energy Ft Lbs/In | | | |
|---|---|---|---|---|---|---|---|
|  |  |  |  | Notched | Unnotched | | |
|  |  |  |  | 73°F | 73°F | 0°F | −20°F |
| 1. Enjay, CD-490 | a) None | 132,000 | 4484 | 0.62 | 30.0 | 4.0 | 3.8 |
|  | b) 10 Wt. % PNA | 173,000 | 4838 | 1.4 | 27.1 | 3.6 | 3.5 |
|  | c) 1 Wt. % PNA | 169,000 | 4770 | 0.83 | 28.2 | 3.8 | 3.6 |
| 2. Enjay, CD-460 | a) None | 179,000 | 5297 | 0.55 | 15.1 | 3.4 | 3.4 |
|  | b) 10 Wt. % PNA | 212,000 | 5422 | 0.98 | 19.6 | 3.8 | 3.4 |
|  | c) 1 Wt. % PNA | 212,000 | 5446 | 0.57 | 22.6 | 4.1 | 3.8 |
| 3. Enjay, CD-392 | a) None | 149,000 | 4262 | 0.61 | 26.4 | 3.6 | 3.6 |
|  | b) 10 Wt. % PNA | 165,000 | 4673 | 1.2 | 22.6 | 3.5 | 3.4 |
|  | c) 1 Wt. % PNA | 156,000 | 4640 | 0.8 | 27.5 | 3.4 | 3.4 |
| 4. Enjay, E-115 | a) None | 217,000 | 5202 | 0.61 | 25.4 | 4.4 | 4.1 |
|  | b) 10 Wt. % PNA | 214,000 | 5421 | 0.97 | 27.2 | 4.6 | 4.2 |
|  | c) 1 Wt. % PNA | 223,000 | 5433 | 0.67 | 29.8 | 5.1 | 4.4 |

EXAMPLE 2

In order to demonstrate the outstanding synergistic benefits of the additives of the invention used in relatively low quantities, in connection with various homopolymer glass-filled compositions employing as the homopolymer, grades designated as "Enjay E-115" and "Enjay E-117" in Example 1 were used. Both of these grades are essentially high crystalline, high molecular weight molding grade polypropylenes which differ from each other primarily in that the E-115 has a 5 MFR and the E-117 has a 12 MFR.

to these compositions were added approximately 1.5 to 2.0 weight percent of a grafted homopolymer of polypropylene containing 6 weight percent of acrylic acid and having a melt flow rate of 50. This graft was prepared according to the extruder technique described in detail in connection with the drawings.

The resulting composition from E-115 was designated as D-540 and the resulting composition from E-117 was designated as D-541. The D-540 and D-541 polypropylene compositions contained a total of approximately 0.10 to 0.20 weight percent of acrylic acid which remained grafted to the base polymer.

These described compositions were blended with 10 weight percent of one-quarter inch Johns-Manville CS308A glass and a series of typical physical properties were determined on the compositions with added acrylic acid graft and with added glass fiber, as compared to the base compositions of E-115 and C-117. The results are summarized below as follows in Table III.

mers were obtained by the addition of relatively small quantities of the grafted polymer modifying agent. The improvements in physical properties are particularly pronounced in the heat deflection temperatures where it can be seen that synergistic improvements result from the use of the glass fibers and the modifying agent at both the 66 psi and 264 psi loads.

The tests described above are standard ASTM tests which are well known to those skilled in the plastics molding art and need not be detailed at this point.

In order to demonstrate the fact that 100% of the grafted polypropylene performs no better in the heat deflection test than a homopolypropylene containing a considerable lesser quantity of the grafted polypropylene, i.e., a 50% polypropylene/50% grafted polypropylene mixture, a series of tests were run, using the E-117 and D-541 grades described above and also with polypropylene composition A which contains 3 weight percent of grafted acrylic acid with a MFR of 12. This corresponds to a 50/50 blend of a 6 weight percent graft with an unmodified polypropylene. Composition B which is a polypropylene composition containing 6 weight percent acrylic acid and with an MFR of 10 was

TABLE III

|  | E-115 | D-540 | D-540 + 10% Glass Fiber | E-117 | D-541 | E-117 + 10% Glass Fiber | D-541 + 10% Glass Fiber |
|---|---|---|---|---|---|---|---|
| Melt Flow Rate, dg/min. | 5.0 | 6.9 | — | 12.0 | 10.6 | — | — |
| Tensile Strength, psi | 4900 | 4945 | 6004 | 4900 | 4991 | 5360 | 5918 |
| Secant Flexural Modulus, M psi | 170 | 184 | 333 | 185 | 184 | 276 | 320 |
| Heat Deflection, °F |  |  |  |  |  |  |  |
| 66 psi | 200 | 237* | 276 | 210 | 216 | 236 | 278 |
| 264 psi | 130 | 140 | 198 | 130 | 144 | 156 | 205 |
| Izod at RT, ft.lb./in. |  |  |  |  |  |  |  |
| Unnotched | 25–27 | 33.4 | 8.8 | 25–27 | 28.7 | 11.9 | 9.0 |
| Notched | 0.7 | 0.6 | 1.4 | 0.5 | 1.7 | 1.1 | 1.3 |
| Crystallization Half-time, min. at 126°C | 6.6 | 0.94 | — | 4.0 | 0.91 | — | — |
| Mold Shrinkage, in/in | 0.01–0.02 | 0.016 | — | 0.01–0.02 | 0.017 | — | — |

*This is an aberrant data point.

As can be seen from the above Table III, significant increases in the physical properties of the base polyalso used. This corresponds to 100% of the modifying agent. The results are summarized below in Table IV.

TABLE IV

TYPICAL PHYSICAL PROPERTIES OF
20% GLASS FILLED[1] POLYPROPYLENE

| | Effect of Resin Grade Type | | | |
| | Grade | | | |
|---|---|---|---|---|
| | E-117 | D-541 Type | Composition A | Composition B (from powder) |
| Tensile strength, psi (Yield) | 6,000 | 7,000 | 10,500 | 11,610 |
| % Strain at break (Yield) | 2.0 | 2.0 | 3.5 | 5.9 |
| Secant flexural modulus, psi × 10⁻³ | 380 | 465 | 550 | 557 |
| Heat deflection temperature, °F at 264 psi | 210 | 245 | 282 | 282 |
| Izod impact strength, RT, ft.-lb./in.[2] | | | | |
| Notched | 1.0 | 1.0 | 1.5 | 1.6 |
| Unnotched | 8.0 | 10.0 | 12.0 | 13.4 |

[1] CS 308A
[2] RT = Room Temperature

EXAMPLE 4

In order to demonstrate the influence of the modifying additives of the invention on impact blends, a further series of compositions and tests were carried out. It should be noted that impact polypropylene is used either with or without glass present. Where glass is used, the markets are in dishwasher tubes, washing machine lids and other appliances and parts where low warpage, impact strength, creep resistance and stiffness are important.

Impact grades can be made either by producing a copolymer in the polypropylene reactor by incorporating some polyethylene blocks into polypropylene copolymer or by incorporating various blends of elastomers and high pressure and low pressure polyethylene as pointed out above in the main body of the specification.

An impact blend containing 40 weight percent ethylene-propylene copolymer, 40 weight percent high density polyethylene and 20 weight percent of isotactic crystalline polypropylene was blended with homopolypropylene in various portions. When this impact blend was blended with polypropylene in relatively large portions, it was noted that a decrease in secant flexural modulus and tensile strength resulted.

Impact characteristics are measured primarily by two different tests in the industry. One of these is the Izod impact test which is an ASTM D-256-56 test in which a pendulum is released so that a sample is broken and the force consumed in breaking is calculated from the height reached by the pendulum on its follow through. The Izod is also run in an unnotched mode.

The other impact test is run with a Gardner modified variable heights impact tester for rigid plastics which is obtained from the Gardner Instrument Company, P. O. Box 5728, 5521 Landy Lane, Bethesda, Md. 20014.

That test relies on dropping a 2 or 4-pound weight from a graduated height up to 40 inches to provide an impact force of from 0–160 inch-pounds. Failure is defined as a visible rupture of the target area. The sheets of plastic which are tested vary from 30–125 mils in thickness.

In general, according to this invention, within certain bounds, the addition of the impact concentrate to acid-modified polypropylene improves both the Izod and the Gardner impact energies as it would a similarly reinforced 100% homopolypropylene, however without so great a loss in stiffness as would be noticed in the homopolypropylene.

Nevertheless, if either glass-filled homopolymer or glass-filled modified polymer is subjected to ordinary Gardner impact tests at room temperature, the performance will be poor.

On the other hand, glass-filled reactor copolymer or impact grade polypropylene will have good Gardner impacts, but they lack the stiffness, tensile strength and heat deflection temperature which even glass-filled homopolypropylene will have.

Thus, one of the features of this invention which will be demonstrated is that certain blending techniques can be used to obtain the good properties of both the glass-filled reactor copolymer and the glass-filled modified polypropylene.

In order to demonstrate the beneficial effect of the modifying agent on improving the secant modulus, tensile strength and heat deflection temperature of impact blends, several compositions were made up containing the impact blend described above in this example which will be designated as "impact concentrate."

Two of these contained small percentages of a modifying agent similar to Composition B except that it had a MFR of 50. This was designated as Composition C. The resulting compositions were compared to a control which had no modifying agent. The results are summarized below in Table V.

TABLE V

EFFECT OF A MODIFIED PP ON PROPERTIES OF 15% GLASS FILLED IMPACT POLYMERS

| Resin Composition | | MFR | HDT at 264 psi, °F | Secant Flex. Modulus, psi | Tensile Strength, psi |
|---|---|---|---|---|---|
| (1) | 50% E-117/ 50% Impact Concentrate | 2.0 | 161 | 183,000 | 3220 |
| (2) | 49% E-117/ 50% Impact Concentrate/ 1% Composition C | 2.0 | 189 | 255,000 | 4070 |
| (3) | 48% E-117/ 50% Impact Concentrate/ 2% Composition C | 2.0 | 209 | 280,000 | 4670 |

As can be seen from the above Table V, small quantities of modifying agent cause significant improvements in important properties of impact blends.

EXAMPLE 6

One of the problems in preparing glass-reinforced impact grades where high Izod properties or high Gardner properties are required is that the two seem to be antagonistic properties. The Izod properties seem to be improved with the presence of grafted modifying agent since adhesion of the matrix to the glass fibers is beneficial with Izod impacts whereas the strong adhesion of glass fibers to the matrix composition tends to be detrimental for the Gardner impact. The antagonistic properties of both can be balanced off by choosing the amount of impact concentrate to be blended with the base polymer and the modifying agent.

A series of compositions were prepared and a great many physical properties of each were measured and compared. A comprehensive of the trade-off of the various physical properties, especially as between the Gardner impact properties and Izod impact properties, as well as the heat deflection temperatures and other important properties will be seen from the following Table VI.

TABLE VI

PHYSICAL PROPERTIES OF JOHNS-MANVILLE CS308A GLASS FILLED RUBBER REINFORCED POLYPROPYLENE AND ACRYLIC ACID MODIFIED POLYPROPYLENE, AND COPOLYMER

| Resin Composition* | Wt. % Glass[4] | Flexural Modulus psi Secant | Flexural Modulus psi Tangent | Tensile Strength at Yield psi | Heat Deflection Temp. °F at 264 psi | N RT | Izod Impact Strength ft-lb/in UN RT | 0°F | −20°F | Gardner Impact Strength in-lb at RT |
|---|---|---|---|---|---|---|---|---|---|---|
| a) Polypropylene 0/22.2/77.8 | 23.6 | 310,000 | 620,000 | 4,400 | 210 | 1.5 | 8.9 | 5.9 | 6.8 | 17.8±0.2 |
| b) Reactor Copolymer | | | | | | | | | | |
| A | 15.1 | 248,000 | 377,000 | 3,460 | 147 | 4.0(H) | 14.3(H) | 5.6 | 5.4 | 78 |
| B | 23.4 | 327,000 | 643,000 | 4,080 | 156 | 4.0(H) | 11.9(H) | 6.8 | 6.6 | 64 |
| C | 38.6 | 341,000 | 916,000 | 4,580 | 215 | 2.8(H) | 7.1(H) | 3.8 | 3.7 | 39 |
| D | 15.1 | 226,000 | 353,000 | 3,660 | 146 | 3.1(H) | 17.0(H) | 7.9 | 7.2 | 76 |
| E | 24.8 | 356,000 | 676,000 | 4,060 | 197 | 3.4(H) | 9.3(H) | 5.4 | 5.5 | 52 |
| F | 32.9 | 373,000 | 802,000 | 4,870 | 176 | 3.3(H) | 7.2(H) | 5.6 | 6.0 | 32 |
| Profax 8823 | 24.8 | 432,000 | 708,000 | 4,980 | 205 | 3.7(H) | 8.5(H) | 5.5 | 5.8 | 65 |
| Shell 7526 | 25.6 | 371,000 | 668,000 | 5,360 | 190 | 2.8(H) | 8.2(H) | 6.0 | 5.7 | 36 |
| c) Acrylic Acid Modified Polypropylene | | | | | | | | | | |
| [1]75/25/0 | 25 | 513,000 | 586,000 | 8,869 | 236 | 2.1 ±0.11 | 6.6 ±0.4 | 6.6 ±0.5 | 6.9 ±0.6 | 3 |
| [1]72.4/28.6/0 | 25 | 419,000 | 492,000 | 7,566 | — | 2.5 ±0.4 | 6.3 ±0.2 | 6.8 ±0.5 | 6.3 ±0.6 | 3 |
| [1]66.7/33.3/0 | 25 | 481,000 | 551,000 | 8,419 | 241 | 2.5 ±0.1 | 7.9 ±0.6 | 7.2 ±0.3 | 7.5 ±0.9 | 3 |
| [2]77.8/22.2/0 | 25.0 | 480,000 | 567,000 | 10,000 | 268 | 2.7 | 16.5 | 17.0 | 16.4 | 11.0±1 |
| [2]72.4/28.6/0 | 25 | 564,000 | 623,000 | 11,263 | — | 2.4 ±0.2 | 11.6 ±0.9 | 12.0 ±0.7 | 12.1 ±0.5 | 3 |
| [3]66.7/33.3/0 | 24.9 | 426,000 | 523,000 | 9,100 | 247 | 3.2 | 17 | 15 | 16 | ~ 8 |
| [2]2.7/21.6/75.7 | 24.8 | 356,000 | 598,000 | 5,400 | 226 | 1.5 | 4.3 | 3.9 | 4.1 | 15±4 |
| [2]13.3/19.2/67.5 | 24.5 | 548,000 | 612,000 | 9,000 | 280 | 1.3 | 7.6 | 8.5 | 8.3 | 3.2±0.4 |
| [2]66.7/7.4/25.9 | 24.3 | 539,000 | 608,000 | 11,200 | 280 | 1.9 | 14.5 | 14.4 | 13.5 | 6.3±1.5 |
| [2]13.3/86.7/0** | 25.6 | 474,000 | 555,000 | 7,200 | 271 | 1.8 | 6.7 | 6.7 | 7.2 | 13.8 |
| [2]53.2/46.8**/0 | 24.7 | 530,000 | 572,000 | 10,000 | 284 | 1.9 | 9.4 | 10.6 | 10.7 | 6.1 |
| [2]1/50/49 | ~ 25 | 409,000 | 495,000 | 6,088 | 185 | 3.4 | 4.9 | 4.4 | 4.5 | 38±12 |
| [2]1/50/49 | 25 | — | 496,000 | 4,831 | 180 | 2.5±0.1 | 4.3±0.4 | 3.3±0.2 | 3.2±0.2 | 65±3 |
| [2]1/50/49 | 25 | — | 499,000 | 5,076 | 200 | 2.1±0.04 | 4.1±0.8 | 3.0±0.1 | 3.1±0.2 | 62±2 |
| [2]1/50.49 | 15 | 255,000 | 329,000 | 4,197 | 162 | 4.7±0.3 | 9.3±1.8 | 4.3±0.3 | 4.3±0.2 | 93±5 |
| [2]1/50.49 | 15 | 255,000 | 332,000 | 4,073 | 189 | 4.0±0.2 | 8.6±1.0 | 4.4±0.4 | 4.5±0.3 | 84±3 |
| 0/50/50 | 15 | 214,000 | 348,000 | 3,336 | 150 | 6.1±0.2 | 19.4±0.7 | 8.6±0.5 | 7.1±1.0 | 96±6 |
| 0/50/50 | 15 | 183,000 | 210,000 | 3,218 | 160.5 | 5.6±0.2 | 15.6±1.8 | 8.2±0.4 | 7.1±1.0 | 91±2 |
| [2]2/50/48 | 15 | 280,000 | 346,000 | 4,665 | 209 | 2.9±0.2 | 6.0± 0.7 | 3.7±0.3 | 4.1±0.2 | 74±3 |
| [2]1/50/49[3] | 15 | 275,000 | 349,000 | 4,442 | — | 2.4 | 4.8 | 3.7 | 3.7 | 73±3 |
| [2]1/50.49[3] | 25 | — | 521,000 | 4,605 | — | 1.7 | 3.9 | 2.9 | 3.2 | — |
| d) Acrylic Acid Modified Reactor Copolymer | | | | | | | | | | |
| | 25 | 509,000 | 553,000 | 9,670 | 277 | — | — | — | — | 3 |

*Weight percent acrylic acid modified polypropylene/impact concentrate/homopolypropylene. Underlined third number means it is E-115, i.e. 5 MFR polypropylene. If third number has no underlining, it is E-117, i.e. 12 MFR polypropylene.
**Assumes copolymer contains the equivalent of 33% impact concentrate.
[1]Grafted polypropylene containing 6 weight percent of grafted acrylic acid with a MFR of 5.
[2]Composition C, i.e. 6 weight percent grafted acrylic acid with MFR of 50.
[3]Homopolypropylene with a MFR of 30.
[4]Underlined number indicates glass is ⅛" long; otherwise glass is ¼" long.

What is claimed is:

1. The method of improving the properties, including crystallization rates, of a composition comprising non-grafted crystallizable polypropylene which comprises:

a. incorporating into said crystallizable polypropylene from 0.1 to 15 weight percent of a modifying agent consisting essentially of a grafted polyolefin wherein said graft component comprises 0.1 to 15 weight percent of acrylic acid or glycidyl acrylate,
   b. melting said crystallizable polypropylene, and
   c. cooling the resulting blend to the temperature of crystallization of said blend and thus forming very small sperulites because of the presence of said modifying agent, wherein said composition also contains impact components selected from the group consisting of olefin elastomers, polyethylenes and combinations thereof.

2. A polymeric composition of matter comprising:

a. a major portion of crystallizable polypropylene; and
   b. about 0.1 to 15 weight percent of an acrylic acid or glycidyl acrylate grafted $C_2$ to $C_8$ polyolefin containing from about 0.1 to 15 weight percent of said grafted component, wherein said composition also contains impact components selected from the group consisting of olefin elastomers, polyethylenes and combinations thereof.

3. A method according to claim 1 wherein said grafted polyolefin is acrylic acid or glycidyl acrylate grafted polypropylene and wherein said grafted acrylic acid or glycidyl acrylate is present in about 2 to 8 weight percent based on said grafted polyolefin.

* * * * *